UNITED STATES PATENT OFFICE.

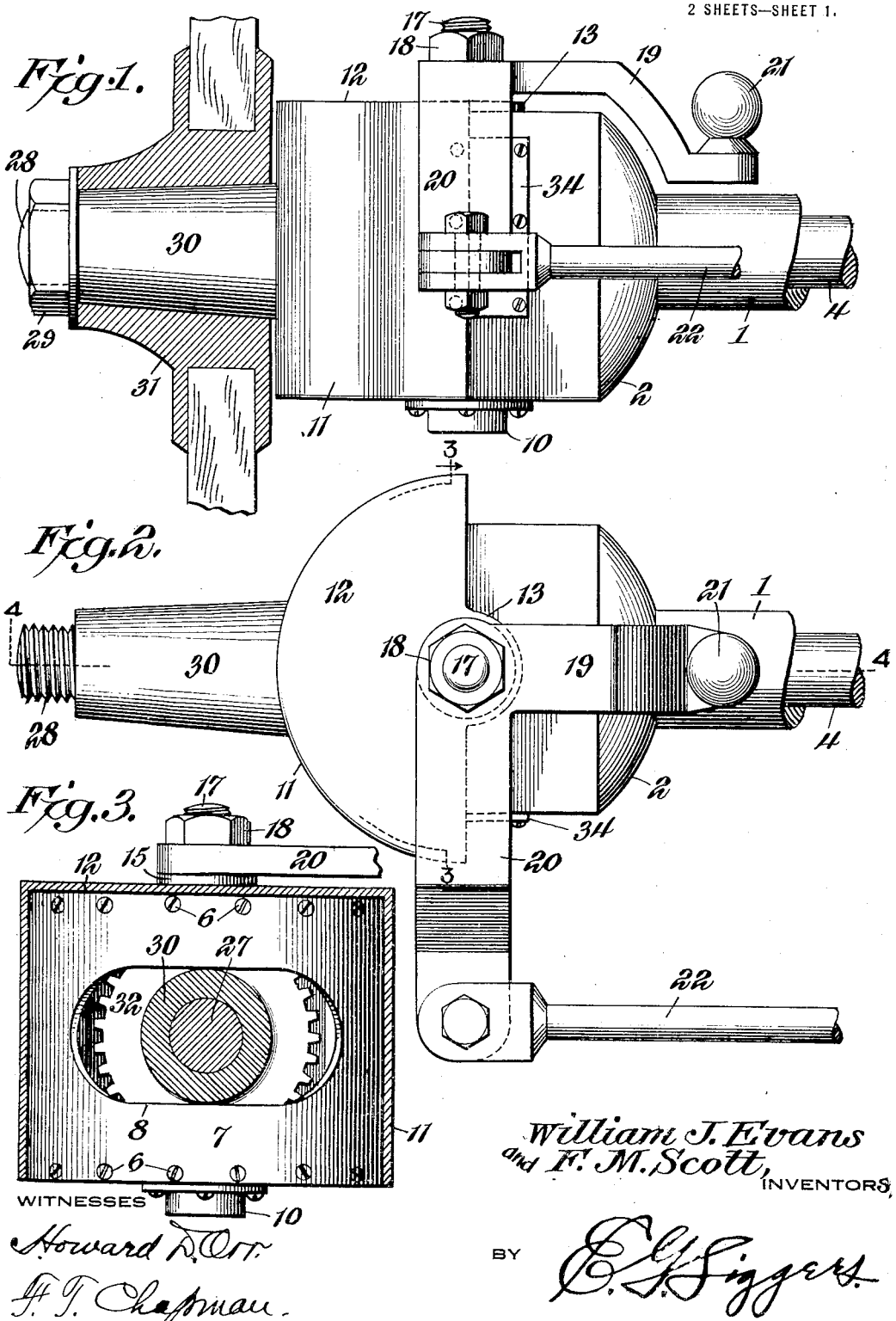

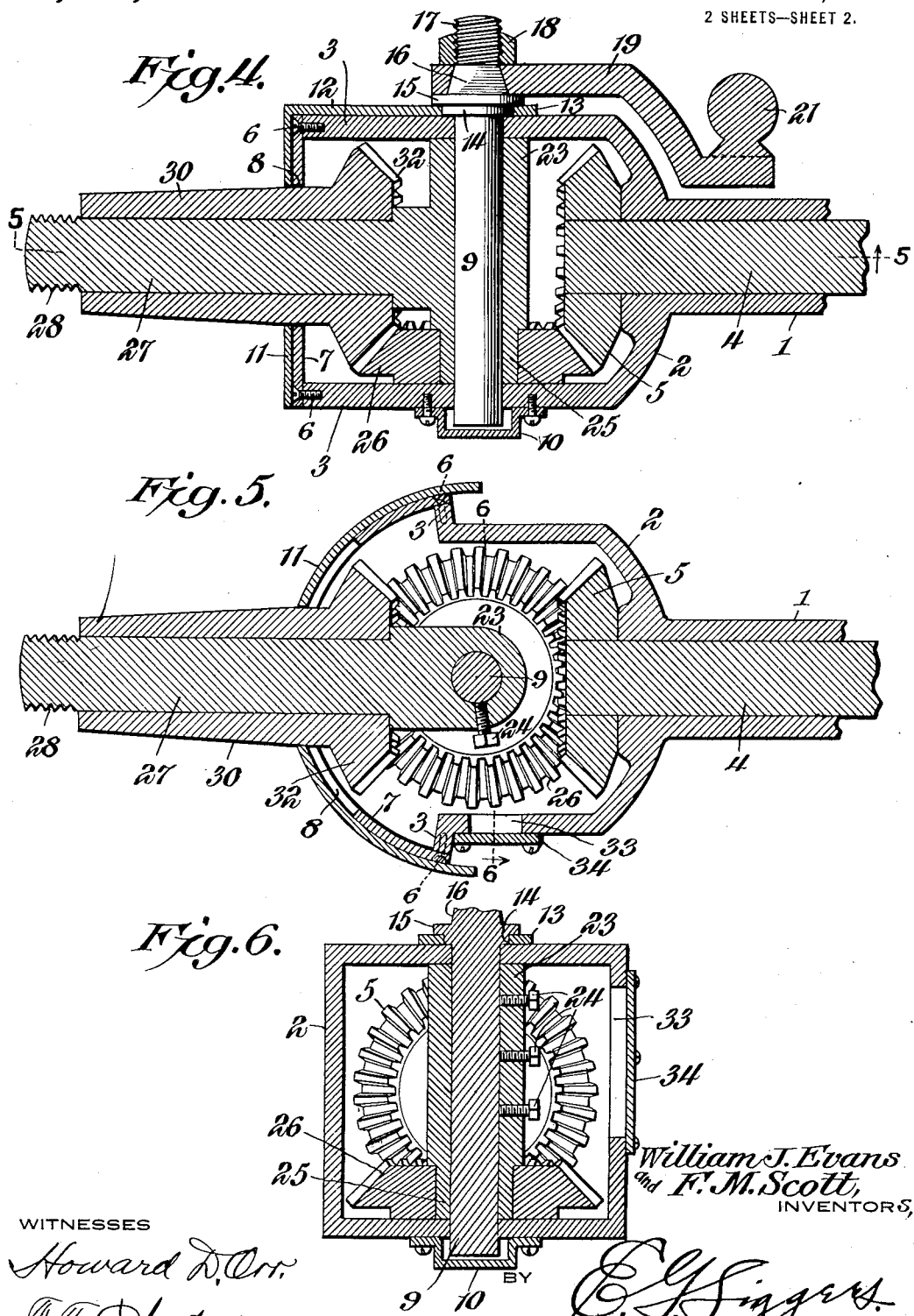

WILLIAM J. EVANS AND FRANCIS M. SCOTT, OF DAYTON, IOWA; SAID SCOTT ASSIGNOR TO SAID EVANS.

COMBINED DRIVING AND STEERING WHEEL FOR MOTOR-VEHICLES.

1,333,908. Specification of Letters Patent. Patented Mar. 16, 1920.

Application filed April 20, 1918. Serial No. 229,819.

*To all whom it may concern:*

Be it known that we, WILLIAM J. EVANS and FRANCIS M. SCOTT, citizens of the United States, residing at Dayton, in the county of Webster and State of Iowa, have invented a new and useful Combined Driving and Steering Wheel for Motor-Vehicles, of which the following is a specification.

This invention has reference to combined driving and steering wheels for motor vehicles, whereby the steering wheels of the vehicle may be utilized as driving wheels and either the two front wheels or the two rear wheels or all four wheels may be utilized for both driving and steering.

Since the wheels may be all alike a description of one will answer for both, in the case of a pair of wheels, or for all the wheels if all four be employed.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a side elevation of a housing and adjacent parts, showing a wheel in section.

Fig. 2 is a plan view of the structure shown in Fig. 1, but omitting the wheel.

Fig. 3 is a section on the line 3—3 of Fig. 2.

Fig. 4 is a section on the line 4—4 of Fig. 2.

Fig. 5 is a section on the line 5—5 of Fig. 4.

Fig. 6 is a section on the line 6—6 of Fig. 5.

Referring to the drawings, there is shown a hollow axle 1 which may be considered as extending from side to side of the machine, but one end of the axle is illustrated in the drawings. At the outer end the hollow axle is expanded into a housing 2 which may be approximately rectangular, although not necessarily so. That end of the housing remote from the axle 1 is open, the opening being shown as to the full extent of the cross sectional area of the housing, and the side walls of the housing at the open end flare outwardly or comprise reversely directed flanges 3, thus making the mouth end of the housing wider than high or of laterally elongated rectangular shape. The axle end of the housing may be rounded, as shown, but such particular shape is not obligatory.

Extending lengthwise through the hollow axle 1 is a power shaft 4 which may be assumed as driven from the engine of the automobile, either directly or through suitable transmission gearing, but such arrangements being common no attempt is made to show them. Within the housing 2 the shaft 4 carries a bevel gear wheel 5 made fast to the shaft in any suitable manner.

Secured to the flanges 3 by screws 6 or otherwise are the sides and ends of an approximately semi-cylindrical plate 7 centrally through which plate there is an oblong opening 8. The plate 7 with its slot or opening 8 is concentric with a king-pin 9 in the casing 2. This king-pin is upright in operative position and is journaled in the top and bottom members of the casing. The upper end of the king-pin projects above the casing while the lower end journaled in the lower wall of the casing enters a cup 10. Covering and concentric with the plate 7 is another plate or apron 11 which may have a greater circumferential length than the plate 7, and the apron 11 has a top member 12 which may be of approximately semi-circular form with a central expansion 13 surrounding and traversed by the king-pin. To provide a suitably extensive bearing for the expansion or enlargement 13 about the king-pin the latter is formed with an integral collar 14. To hold the apron 11 onto the casing 2 and in closing relation to the slot or opening 8, the king-pin 9 is provided, above the collar 14, with an outstanding flange 15 to bear against the top 12 and central expansion 13 of the apron 11. Beyond the flange 15 the king-pin has an axial prolongation 16 which may be tapered and squared or made of other non-circular form and terminates in a threaded stem 17 for the application of a nut 18. The squared part 16 of the king-pin has applied thereto the meeting parts of two arms 19 and 20 respectively, these arms being shown as in right angular relation and carried by the king-pin. The arm 19 is prolonged to a suitable extent and terminates in a knob 21 which may constitute the ball of a ball and socket joint and is designed to receive a reach-rod, not shown, for extension to the steering control of the vehicle. The other arm 20 is connected to one end of a rod or link 22 which may be considered as joining the arm 20 to a similar arm on the corresponding wheel at the other side of the vehicle.

Within the casing 2 and surrounding the king-pin 9 is a sleeve 23 made fast to the king-pin by set screws 24 or in any other appropriate manner. The sleeve 23 has a reduced portion 25 on which is mounted an idler bevel gear wheel 26 meshing with the gear wheel 5. Projecting radially from the sleeve 23 about midway of its length is a wheel spindle 27 threaded at the outer end, as shown at 28, to receive a nut 29. The spindle 27 projects through the slot 8 and is surrounded by a sleeve 30 on which a wheel 31 is secured. The sleeve 30 carries or has fast thereon a bevel gear wheel 32 which, when the parts are assembled, meshes with the idler gear wheel 26.

To assemble the parts the driving shaft 4 and gear 5 are placed into the gear box or casing 2 and hollow axle 1. Then the idler gear is placed on the end 25 of the sleeve 23 and the sleeve 30 with the gear 32 is placed upon the spindle 27, after which the parts are all inserted in the gear box.

The plate 7 is now applied to the flanges 3 where it is held by the screw 6, said plate 7 serving as an oil retainer, permitting a depth of lubricant determined by the height of the lower wall of the slot 8. The apron 11 is then applied, after which the king-pin 9 is applied and the set screws 24 are tightened, this latter procedure being permitted by the provision of a slot 33 in one of the side walls of the casing or box 2. This slot has a cover plate 34 which may be removed as needed to give access to the interior of the box for tightening or loosening the set screws, for oiling and for inspection.

Power applied to the shaft 4 is transmitted through the transmission bevel gearing to the sleeve 30 on which the wheel 31 is secured. Steering is accomplished by means of the steering arm 19 under the control of a suitable steering gear, not shown, the spindle 27 being fast to the king-pin to which the arm 19 is also secured and the swinging movement of the spindle 27 about the axis of the king-pin being permitted by the length of the slot 8.

What is claimed is:—

1. A combined driving and steering wheel for automobiles, comprising a hollow axle having a gear box at one end, with outwardly flaring side flanges at the end remote from the axle, a king-pin traversing the gear box, a cover plate for the outer end of the gear box curved concentrically to the king-pin and carried by the flanges, said cover plate being provided with an elongated slot, a spindle mounted on the king-pin to turn therewith, a curved plate or apron through which the spindle extends and movable therewith about the axis of the king-pin, a power shaft extending through the hollow axle, and gearing within the gear box for transmitting power from the shaft to a wheel turning about the spindle.

2. A combined driving and steering wheel for automobiles, comprising a hollow axle with a substantially rectangular gear box at the end of the hollow axle with oppositely directed outwardly flaring terminal flanges at the opposite sides, a king-pin traversing the gear box, a cover plate fast to the flanges and concentric with the longitudinal axis of the king-pin, a similarly curved apron traversed by the king-pin and movable along the cover plate exterior thereto, intermeshing gearing within the gear box with one of the gears provided with a sleeve traversing the curved plate and apron, and a spindle fast to the king-pin and traversing the sleeve.

3. A combined driving and steering wheel for automobiles, comprising a hollow axle with a substantially rectangular gear box at the end of the hollow axle with oppositely directed outwardly flaring terminal flanges at the opposite sides, a king-pin traversing the gear box, a cover plate fast to the flanges and concentric with the longitudinal axis of the king-pin, a similarly curved apron traversed by the king-pin and movable along the cover plate exterior thereto, intermeshing gearing within the gear box with one of the gears provided with a sleeve traversing the curved plate and apron, and a spindle fast to the king-pin and traversing the sleeve, the spindle where engaging the king-pin being formed into a sleeve and having set screws traversing the sleeve for holding the latter to the king-pin, and the gear box being provided with an opening through one side wall to give access to the set screws and provided with a cover plate normally closing the opening.

4. A combined driving and steering wheel for automobiles, comprising a hollow axle having a substantially rectangular gear box at one end with laterally flaring flanges at the outer end of the gear box, a king-pin traversing the gear box from top to bottom, a cover plate fast to the flanges and concentric with the king-pin, a power shaft extending through the hollow axle and provided with a bevel pinion within the gear box, a sleeve surrounding the king-pin within the gear box and carrying a radial spindle extending through the cover plate, an idler pinion mounted on the king-pin within the gear box and meshing with the first-named pinion, a sleeve mounted on the spindle and extending through the cover plate of the gear box and also provided with a pinion meshing with the second-named pinion, and a curved plate or apron concentric with and exterior to the cover plate, said apron having a top member movable on the top of the gear box and traversed by the king-pin.

5. In a combined driving and steering wheel for automobiles, a gear casing, a king-pin traversing the gear casing, a spindle with a terminal sleeve mounted on the king-pin within the casing, the sleeve being provided with set screws for fastening it to the king-pin and the casing having a slot therethrough for permitting access to the set screws, and a cover plate for closing the slot.

6. In a combined driving and steering wheel for automobiles, a hollow axle with an integral gear box at the end and open on the side remote from the hollow axle, a spindle mounted in the gear box, a king-pin traversing the spindle within the gear box and constituting an axial support therefor, and fastening means within the box for fastening the spindle and king-pin together, the box having an opening through one wall to give access to the fastening means and said opening being provided with a removable cover plate.

7. In a combined driving and steering wheel for automobiles, a drive shaft, gearing connected thereto, a hollow axle surrounding the drive shaft, a gear box integral with the hollow axle and housing the gearing, said gear box being open at the end remote from the hollow axle, a spindle extending through the open end of the gear box and rockable about an axis at one end of the spindle, and two cylindrically curved plates in face to face contact and concentric with the axis of rocking of the spindle, said plates being also traversed by the spindle, one plate being fast to the open end of the gear box and constituting a cover therefor and the other plate being of larger area than the first-named plate and supported from the top of the gear box.

In testimony, that we claim the foregoing as our own, we have hereto affixed our signatures in the presence of two witnesses.

WILLIAM J. EVANS.
FRANCIS M. SCOTT.

Witnesses:
EMORY A. ROLFE,
WILL A. CALVEY.